United States Patent
Carter et al.

[15] 3,665,495
[45] May 23, 1972

[54] NO BREAK POWER SYSTEM

[72] Inventors: Robert Carter, Richmond; Ralph A. Amos, Bon Aire; Charles A. Gregory, Jr., Richmond, all of Va.

[73] Assignee: Power Systems and Controls, Incorporated, Richmond, Va.

[22] Filed: June 1, 1970

[21] Appl. No.: 42,041

[52] U.S. Cl. ................................................. 307/67, 290/4 R
[51] Int. Cl. ........................................................ H02j 9/00
[58] Field of Search .................... 307/67, 66, 64; 290/4, 30; 318/138, 254

[56] References Cited

UNITED STATES PATENTS

| | | | |
|---|---|---|---|
| 3,614,461 | 10/1971 | Speer | 307/66 X |
| 3,526,778 | 9/1970 | Crocker et al. | 290/30 |
| 3,243,598 | 3/1966 | Grillo | 307/67 X |
| 3,142,793 | 7/1964 | Grillo | 290/4 X |
| 2,783,393 | 2/1957 | Lindahl et al. | 290/30 X |
| 2,972,056 | 2/1961 | Park et al. | 290/4 X |
| 3,229,111 | 1/1966 | Schumacher et al. | 307/66 X |
| 3,296,451 | 1/1967 | Ausdal et al. | 290/30 X |
| 3,345,517 | 10/1967 | Smith | 290/4 |
| 3,418,550 | 12/1968 | Kolatorowicz | 318/254 X |

Primary Examiner—J. V. Truhe
Assistant Examiner—George A. Montanye
Attorney—Jones & Lockwood

[57] ABSTRACT

A standby power supply system is disclosed wherein a load is normally connected to and driven by the output of a synchronous generator. The generator is in turn driven by a synchronous motor energized by a three-phase oscillator controlled inverter which derives its power from a source of direct current. This direct current is provided by a rectified utility source during normal operation and by a standby power source when a fault occurs in the utility. The standby source is shown as a high capacity battery floating on the DC line, whereby it is charged by the utility, and is also immediately available for standby operation. The inverter oscillator is controlled to maintain phase and frequency synchronization between the load power and the utility during normal operation, but becomes free running during standby.

8 Claims, 9 Drawing Figures

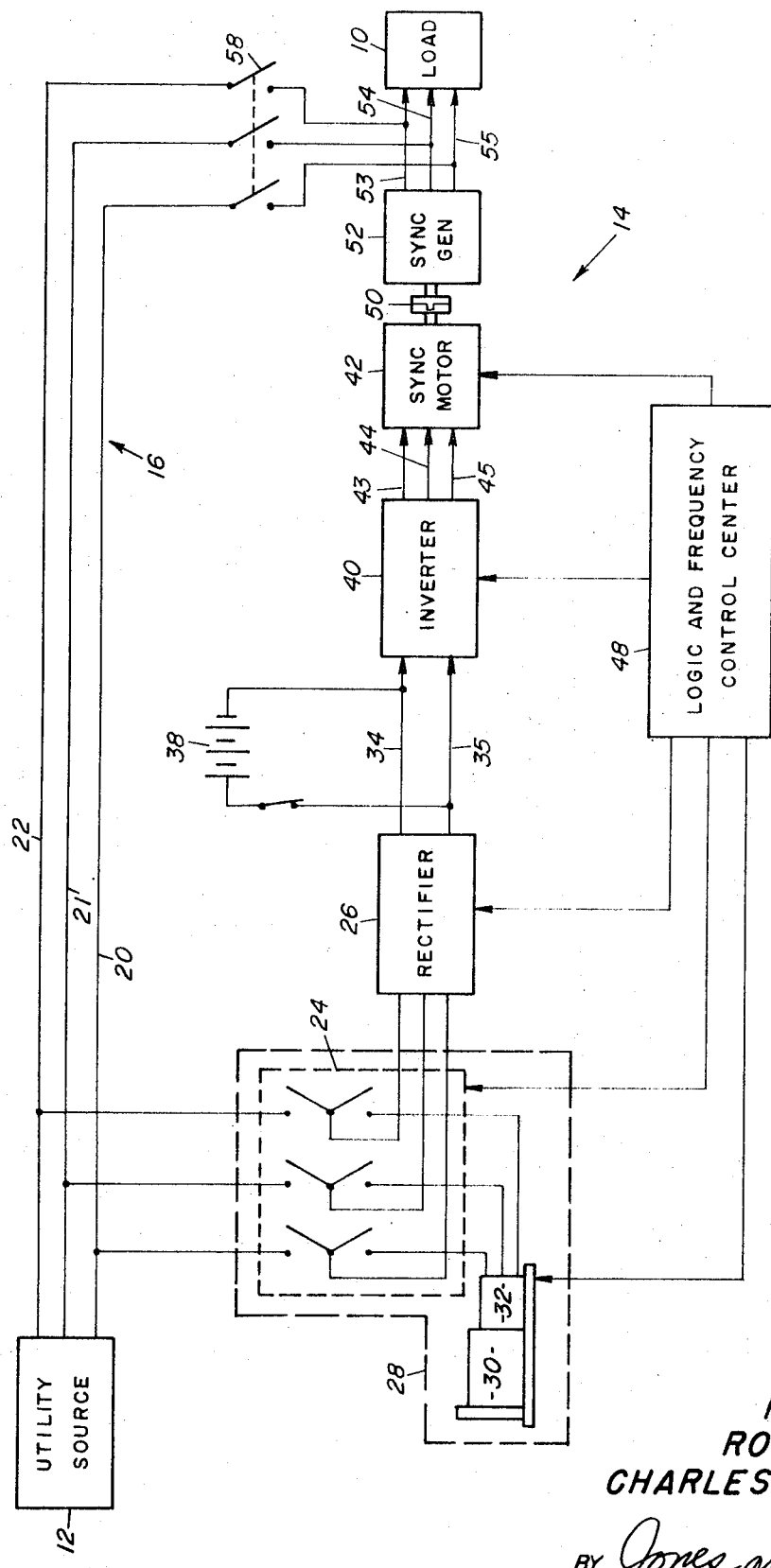
FIG. I
INVENTORS
RALPH A. AMOS
ROBERT CARTER
CHARLES A. GREGORY, JR.
BY *Jones and Lockwood*
ATTORNEYS

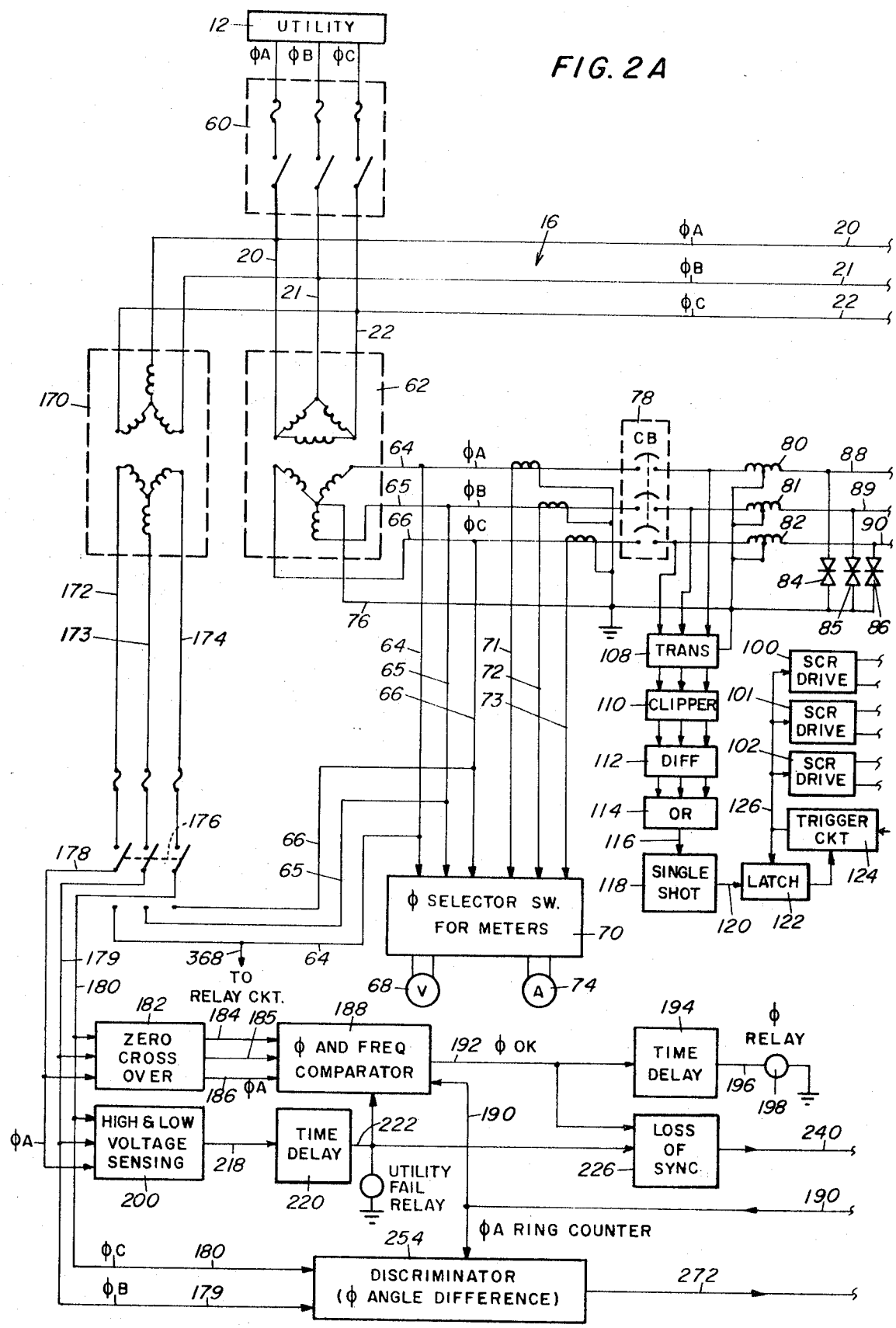

NO BREAK POWER SYSTEM

FIELD OF THE INVENTION

The present invention relates, in general, to standby power supply systems, and more particularly to such systems which utilize synchronous motor-generator sets to produce the desired constant load current and voltage. In the present invention, the synchronous motor-generator set is driven by a utility source until a fault occurs in that source, at which time the system instantaneously shifts to a battery source of standby power, which then drives the set. Control means are provided for the system to maintain phase and frequency synchronization between the utility source and the load power, and, if desired, to switch into the system an auxiliary source of power in place of the utility source in the event of an extended fault condition. When the utility source is restored, the system can be shifted back to the battery source, synchronization established between the load and utility, and the utility power reconnected.

BACKGROUND OF THE INVENTION

A serious problem exists in the operation of any equipment of a type that requires continuous energization, for as long as the possibility of a power failure is present, whether it be a large scale failure or a locally caused fault, there is uncertainty as to the reliability of such equipment. Although in many cases a slight pause in electric service is not objectionable, there are increasing numbers of applications where continuous supply is critical. For example, an electronic computer which relies on a continuous power supply to maintain data storage can be seriously affected by a loss of energization, for such a loss would result in destruction of all its stored information. Even an instantaneous loss of power could be sufficient to completely wipe out the information. Similarly, a very brief power failure could completely disrupt a communication system, particularly where the loss of even a small amount of information would invalidate the complete message, resulting in loss of time, money, or even life. A landing control system at an airport cannot afford to be without power even for a brief moment, for such systems must maintain continuous monitoring and/or contact to insure the safe operation of the system. Many other uses of electric power, where continuous supplies are critical, will be apparent to those familiar with such problems.

Many methods have been devised in the past in an effort to provide an effective and efficient standby power supply system. The earliest attempts at this utilized large banks of batteries which would serve to supply load requirements for a short period of time. However, although such systems were satisfactory for lighting arrangements and the like, the cost and trouble of maintaining such systems to keep them in good repair and fully charged made them impractical. Further, the serious power limitations of such power banks of batteries make them unsatisfactory for most uses.

Another method that has been tried is the use of high inertia devices, such as flywheels, which are continuously rotated by motor-generator machines floating on the utility line. Upon failure of the utility power, the inertia of the flywheel carries the generator until an auxiliary prime mover can be energized to take over the generation. Such systems were, in many respects, a distinct improvement over the banks of batteries, but presented their own problems, for the maintenance and lubrication of bearings and the like for heavy flywheels is a continuous problem. Further, any slight delay in the ignition of the auxiliary prime mover results in an undesirable decay in the energy produced by the generator and applied to the load. The efficiency of such systems is relatively low, for much power is consumed in maintaining the rotation of the flywheel.

Other, more sophisticated, systems have been devised to overcome the problems left unsolved by these methods, but none have been able to provide the continuity required by sensitive loads in combination with the efficiency that would make them commercially attractive. Furthermore, none of these systems has adequately solved the problem of providing both short term and long term standby capabilities with a minimum disturbance in the load current and voltage. Some systems are able to provide immediate standby power, but are only capable of providing such power for a short period of time. Those systems which are capable of providing long term standby power generally involve the use of internal combustion engines or the like which have a relatively long starting time and thus are inherently incapable of producing an immediate response to the failure of the utility supply.

In copending application Ser. No. 658,398, filed Aug. 4, 1967, and entitled "No Break Power System," now U. S. Pat. No. 3,536,778 which issued on Sept. 1, 1970, and which is assigned to the assignee of the present application, the problems of the prior art were overcome by the provision of a synchronous motor-synchronous generator set floating on the power line leading to the load. This motor-generator set was driven from a direct current standby source, such as a bank of batteries, which current was converted to three-phase alternating current by means of a solid state inverter circuit. Suitable control circuitry, including an oscillator-driven ring counter network, maintained this three-phase alternating current in phase and frequency synchronization with the utility source for driving the motor-generator set when needed. Upon failure of the utility source, the synchronous motor-generator set continued to operate but shifted from a floating operation to a positive one to provide the required power to the load, without interrupting the current and voltage received by that load. A major feature of that invention was the provision of a synchronous motor having a leading power factor, whereby a controlled rectifier inverter could be used to directly feed the synchronous motor. The leading power factor served to commutate the controlled rectifiers and thus reduced substantially the cost of the system by eliminating the normally required commutating circuits. By driving the motor through an inverter circuit, the phase and frequency of the standby power source could be closely regulated, and because of the nature of a synchronous motor, which requires it to operate at synchronous speed, it would drive its generator at the same speed, and the power supplied to the load would be constant. Thus, the system disclosed in that copending application eliminated the frequency decay problems of the prior systems, among other things.

In describing the basic concept of the invention set forth above, the said copending application discloses an embodiment thereof wherein the synchronous motor-generator set is connected to the load in parallel with the normal utility supply, so that when one is operative, the other is not. The load is normally connected to the utility line through a transfer switch and through a silicon controlled rectifier fault disconnect switch. The floating standby power supply consists of a pair of mechanically coupled synchronous machines connected as a motor-generator set, and, in the embodiment disclosed, the synchronous motor is normally de-energized while the synchronous generator, which is connected to the load, derives power from the utility source and operates as a motor to rotate the motor-generator set at synchronous speed. The synchronous motor is connected through an inverter to a high capacity battery power supply, but the inverter is turned off so that the motor is not energized. The control system senses the voltage, phase and frequency of the utility power, and includes oscillator means for operating the inverter, the oscillator running in phase with the utility supply. Upon occurrence of a fault in the incoming utility power, the fault disconnect switch is turned off and the inverter is turned on to energize the synchronous motor. Since the motor is already rotating at synchronous speed, and the inverter is being driven by the oscillator in phase with the power supply, the motor-generator set instantaneously supplies power of the proper frequency, phase, current and voltage to the load, replacing the utility supply with barely a ripple in the load power wave forms. The control circuitry also responds to the fault to start an auxiliary power supply system, which may be a diesel-driven generator, and operates the transfer switch to remove the utility power supply from the line and connect the auxiliary generator. After the auxiliary is brought to rated frequency and voltage, the control system shifts the phase and frequency of the oscillator until it is in phase with the auxiliary generator and the load is shifted to the auxiliary generator.

Once the auxiliary generator is carrying the load, the standby source is de-energized, and the system operates as before. Upon restoration of utility power, the load is again shifted to the standby motor-generator set, the auxiliary generator is shut down and the transfer switch shifts over to utility power. The control circuitry then brings the inverter into phase with the utility power, the fault disconnect switch places the load on the utility, and the standby source is de-energized.

Although the system as described and claimed in the said copending application is a distinct improvement over the prior art, it has been found that certain additional advantages can be achieved by a modification of the particular arrangement disclosed. This modification reduces the amount of logic circuitry required to control the system, thereby substantially reducing the initial expense of the system. Further, by eliminating some of the control circuitry as well as some of the power handling switches, a more reliable system is obtained which is easier to maintain than the system of the copending application.

SUMMARY OF THE INVENTION

It is, therefore, an object of the present invention to provide a standby power supply system that is efficient, inexpensive to operate and maintain, and which responds instantaneously to a fault condition to maintain the required power at a load with virtually no change in load voltage, current or frequency.

It is a further object of the invention to provide a standby power system utilizing a synchronous motor-generator set wherein the standby power supply floats across the load line when power is being supplied in the normal manner from a utility source, but which instantaneously replaces the utility supply upon occurrence of a fault condition.

A further object of the invention is the provision of a standby power supply wherein the synchronous motor is energized by a silicon controlled rectifier inverter, the synchronous motor being operated with a leading power factor to eliminate the need for additional means of commutation for the controlled rectifiers.

A further object of the invention is to provide a synchronous motor-generator set which is operated by an improved solid state circuit for maintaining the output of the motor-generator set at its rated frequency and phase whether the system is operating from a utility supply or a standby supply.

An additional object of the present invention is to provide a standby power supply system utilizing a synchronous motor-synchronous generator set in the load line, the synchronous motor being driven by a solid state inverter to operate at synchronous speed, the DC voltage supplied to the inverter being derived from either a rectified utility source or from a standby battery source, whereby the load operates from the output of the generator and thus receives a constant voltage and current input.

It is another object of the present invention to provide a simplified control circuit for a standby power supply system wherein the system floats across the utility source, both the standby and the utility being direct current voltages, the source voltage being applied across an inverter which is operated at a predetermined frequency to produce an alternating output at a predetermined frequency and phase, the logic circuitry maintaining the inverter in phase with the utility source by controlling a voltage controlled oscillator which, in turn, operates the inverter, whereby a synchronous motor operated by the alternating current voltage at its synchronous speed drives a corresponding synchronous generator which feeds a continuous output of the desired power and frequency to the load.

Briefly, the present system contemplates the provision of a standby power supply system which, in the disclosed embodiment, includes a synchronous motor-generator set driven by an oscillator-controlled inverter which derives its power either from a rectified utility source or from a standby battery source normally floating on the DC utility line. The present disclosure is directed to a system which is adapted to operate on standby for a limited time, as determined by the capacity of the standby battery source; however, where long-term standby power is needed, a diesel-driven generator may be provided for use as an auxiliary power supply. The use of such an auxiliary source is described in detail in the said copending application Ser. No. 658,398, and its connection and operation in the present system will be evident from the disclosure therein.

The utility supply is fed, in the present system, to a first rectifier which is a three-phase, full wave, hybrid bridge utilizing three diodes and three silicon controlled rectifier devices (SCRs) or their equivalents. The SCR devices are used to control the voltage output of the rectifier when there is a possibility of a fluctuating input voltage, in order to maintain a constant voltage level in the DC lines. The floating standby power source of the present system utilizes the motor-generator set of the above-mentioned copending application, but in a modified manner. That is, the present system utilizes the fact that the critical load can be continuously driven from a DC source, through the inverter and motor-generator set, and that it would make no difference, as far as the load is concerned, whether that DC source was provided by the rectified utility power or by the standby batteries. Thus, the standby batteries are connected to float across the rectified utility power, and one or the other source serves to power a three-phase, full wave controlled rectifier inverter bridge circuit which converts the direct current to an alternating current. The inverter is appropriately gated to feed three-phase alternating current to a synchronous motor, the shaft of which is connected to a synchronous generator so that both will rotate at the speed dictated by the inverter control system, and the output of the synchronous generator is fed directly to the load. By the use of this arrangement, the advantages of the synchronous motor-synchronous generator method of providing standby power, as described in the said copending application, is not lost, while at the same time the control logic for such a system is simplified by the elimination of many circuits used in the above-identified copending application. The simplified logic circuit utilizes a voltage controlled oscillator to operate a ring counter which, in turn, feeds the gate drivers for the SCR inverter. The ring counter provides a phase signal which is compared to the phase of the input utility, this circuit producing an output when the phase relationship is correct to permit the connection of a system bypass, whereby the utility source may be directly connected to the load to permit servicing of the no-break standby system, without damage to the load itself. If there is no phase synchronization, a second comparison circuit produces an analog signal which is fed to the voltage controlled oscillator to gradually change the operation of the inverter so as to bring the two alternating current voltages into proper phase and frequency relationship.

Means are also provided to sense the utility voltage, whereby a variation from predetermined values, either on the high or low side, will produce a fault signal and prevent the voltage controlled oscillator from being regulated by phase and frequency differences between the utility and the load power. The system then is automatically on its standby operation, for the battery supply will maintain the DC voltage to the inverter at the desired level and the voltage controlled oscillator will provide the required alternating source for the synchronous motor within the required frequency drift tolerances. Upon restoration of the utility power, the voltage controlled oscillator will be adjusted to bring the load and utility into phase and frequency synchronization.

BRIEF DESCRIPTION OF THE DRAWINGS

The foregoing and additional objects and features of the present invention will be more fully understood and appreciated from reference to the following description and claims, taken in conjunction with the accompanying drawings, in which:

FIG. 1 is a simplified diagrammatic illustration of a system in accordance with the present invention;

FIGS. 2A–2C are a schematic block diagram of the system of the present invention, showing the major features of the standby power supply and the simplified control circuitry;

DESCRIPTION OF THE PREFERRED EMBODIMENT

Figure 2B:
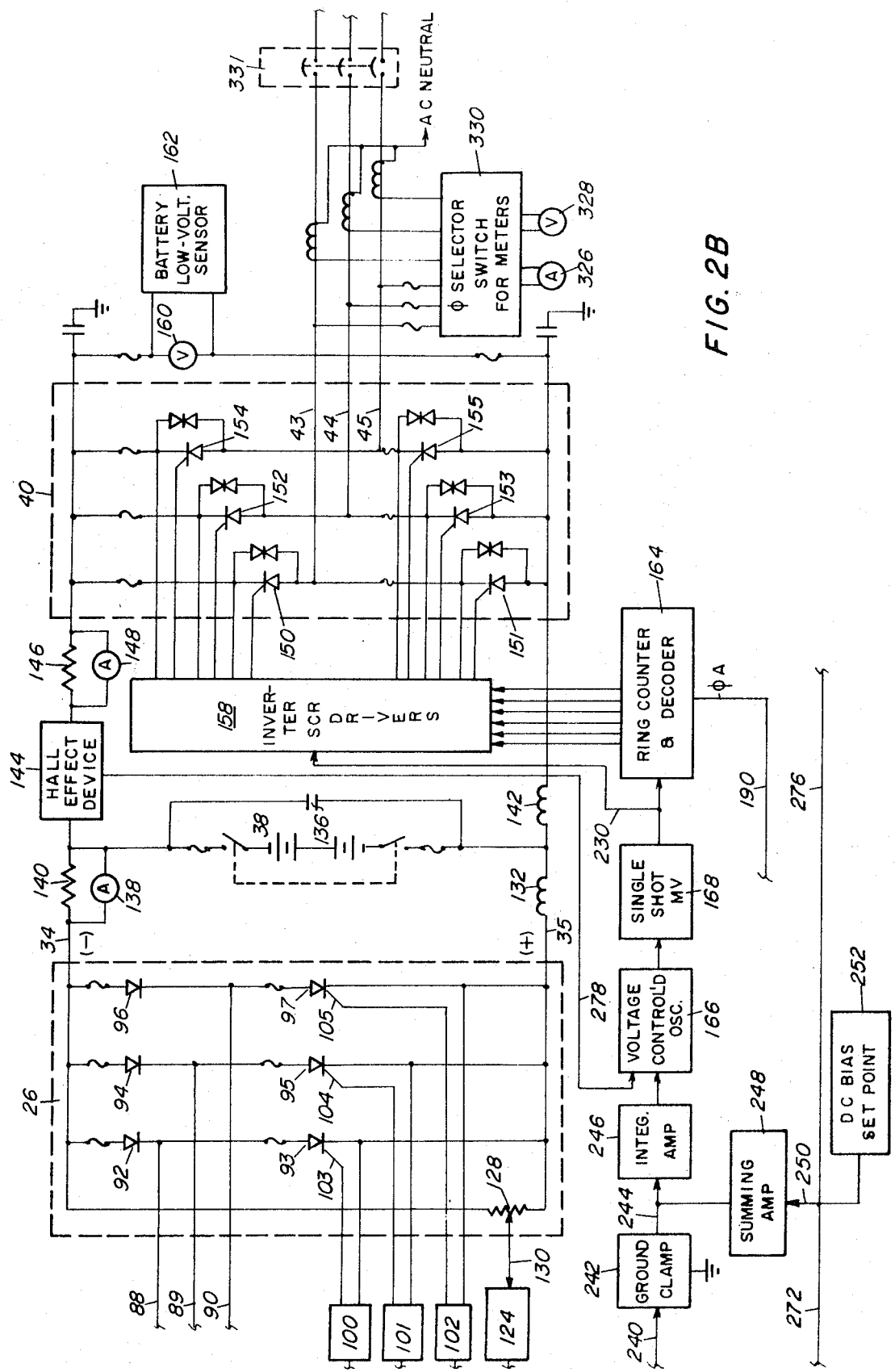

Referring now to FIG. 1 of the drawings, there is illustrated in diagrammatic form the general configuration of a system in accordance with the present invention, wherein a load 10 is normally supplied with power from a utility or other normal source of power 12. The incoming power is fed to the no break, or standby, system generally indicated at 14 and then to the load, the no break system serving to provide load power of the desired phase, frequency, voltage and current characteristics on a continuing basis, independent of fault conditions in the utility source. As shown, a bypass line 16 is also provided which permits direct connection between the utility input and the load 10 whenever maintenance is required on the no break system 14, or when a breakdown occurs in that system.

Considering FIG. 1 in more detail, the input power, typically three-phase alternating current at 60 cycles and 450 volts is supplied by way of lines 20, 21 and 22 to an optional transfer switch 24 and thence to the input of a controlled rectifier 26. The transfer switch 24 is a part of an auxiliary power supply system 28 which may be switched into the input of the no break system 14 a predetermined period of time after the utility source has failed. Such an auxiliary supply allows the standby system to be of limited capacity, thereby reducing its cost, for when the utility source fails, and the system goes on standby power, the auxiliary system is energized by starting up a suitable prime mover 30 such as a diesel engine. This, in turn, drives a three-phase alternating current generator 32 which is of a capacity suitable for the load 10. When the diesel generator is operating at proper frequency and voltage, the transfer switch shifts from the utility source to the auxiliary source and supplies power to rectifier 26. When the utility is restored, the auxiliary supply may be shut down, removing the input from rectifier 26 and causing the system to shift back to the standby source. Thereafter, the utility source may be reconnected to the rectifier for normal operation. The specific operation of the transfer switch and the diesel auxiliary system is not set forth in the present application, since its connection to the load will be apparent from the manner in which the utility source is reconnected to the load after a fault condition has disconnected it, and since the manner in which it will drive the load when connected thereto will be the same as is the case with the utility source. Reference may also be made to the copending application Ser. No. 658,398 for additional details on the manner in which the auxiliary source may be operated.

Rectifier 26 is a simple three-phase, full wave hybrid bridge, and may be constructed with three diodes and three silicon controlled rectifiers or equivalent devices. The SCR devices are used to control the DC voltage output which appears across lines 34 and 35. This control of the DC voltage output prevents fluctuation due to changes in the AC input voltage, and serves to maintain the DC voltage level within, for example, 1 percent of the nominal value. A standby power source 38, consisting of a battery of suitable type and capacity, floats on the output of the rectifier and, when power is being supplied to the rectifier from either the utility source or the auxiliary source, the battery is recharged; upon failure of either power source, the standby battery becomes the power source.

The DC voltage on lines 34, 35 is applied to an inverter 40, which is a simple three-phase, full wave bridge using six controlled switches appropriately gated to feed a three-phase synchronous motor 42 by way of lines 43, 44 and 45. The controlled rectifier devices in the inverter preferably are silicon controlled rectifiers, which devices are operated by means of suitable logic and frequency control circuitry, indicated generally at 48. This center also regulates the operation of the SCR devices in rectifier 26 as well as any other control and indicator functions required of the system.

The synchronous motor is coupled by way of shaft coupling 50 to a synchronous generator 52 so that when the motor runs, the synchronous generator is driven at its rated speed and an output voltage is provided on lines 53, 54 and 55 of the required characteristics for supplying load 10. Load lines 53, 54, 55 are also connected to the utility source 12 by way of lines 20, 21 and 22 and a bypass contactor 58, whereby the utility source can be directly connected to the load, when desired. It will be apparent that the proper phase and frequency relationships must be provided between the output of the synchronous generator 52 and the utility source before the bypass contactors are closed, if the load is to be supplied without interruption. However, under emergency situations the utility and synchronous generator outputs can be substituted one for another without the appropriate synchronization, in which event there will be a brief interruption in the load supply. Such a connection is only made under extreme emergency conditions, and will generally result in a phase shift at load 10.

The system as described herein is much simplified over the said copending application, primarily by reason of the fact that the synchronous motor-generator set is driven continuously from a source of direct current, thereby reducing the phasing problems which existed when shifting from one source of supply to another. Thus, the present system takes greater advantage of the characteristics of the motor-generator set of the device of the copending case, although reducing somewhat the overall efficiency of the power supply system.

Figure 2C:
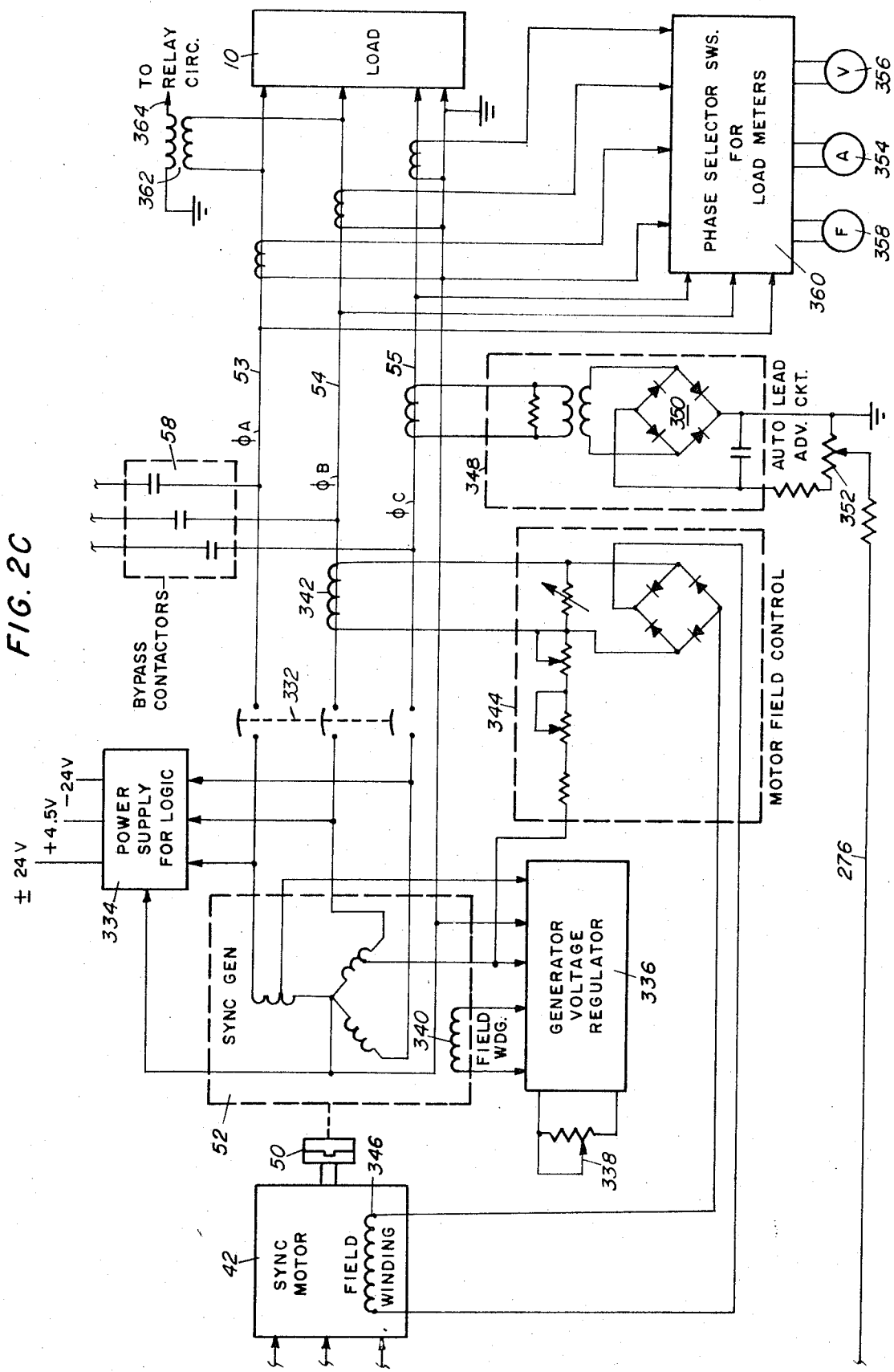

Turning now to a detailed consideration of the system of the present invention, reference is made to FIGS. 2A, 2B and 2C which disclose circuit details of portions of the system of FIG. 1, and which show in block diagram form the logic and frequency control system illustrated generally at 48 in FIG. 1. In this embodiment, the utility source 12 is indicated as having three phases A, B and C which are fed through a fused disconnect box 60 to the bypass lines and to the no break standby system, by way of lines 20, 21 and 22. AC power is fed to the bypass lines 16, and to a power input transformer 62, the secondary winding of transformer 62 being connected by way of lines 64, 65 and 66 to a suitable voltmeter 68. The connection to the voltmeter is through a phase selector switch 70, which permits the voltage of any selected phase to be measured. Similarly, the output lines 64, 65 and 66 are inductively coupled through lines 71, 72 and 73 and through phase selector switch 70 to a suitable ammeter 74, whereby the current level in each of the transformer output lines may be monitored. It will be noted that the neutral connection of the secondary transformer 62 may be connected by way of line 76 to a suitable ground point.

Transformer output lines 64, 65 and 66 are connected through a utility circuit breaker 78, which serves to open lines 64, 65 and 66 in the event of an overload, to stepup autotransformers 80, 81 and 82, the center points of which are connected to ground line 76. These input autotransformers may, for example, step the voltage up from the 208 volts provided by the secondary of transformer 62 to approximately 260 volts. The output of each autotransformer is connected to corresponding transient voltage suppressors 84, 85 and 86, whereby voltage spikes which might not trip the circuit breaker 78, but which might damage the rectifier 26, will be shunted to ground line 76.

Output lines 88, 89 and 90 from the autotransformers 80, 81, 82, respectively, are fed to rectifier 26 (FIG. 2B) which, as has been said, is a three-phase hybrid bridge. Thus, as shown, line 88 is connected to the cathode-anode junction of diode 92 and silicon controlled rectifier 93, line 89 is connected to the cathode-anode junction of diode 94 and silicon controlled rectifier 95, and line 90 is connected to the cathode-anode junction of diode 96 and silicon controlled rectifier 97. The anodes of diodes 92, 94 and 96 are connected through suitable fuses to the negative rectifier output bus 34, while the cathodes of SCR devices 93, 95 and 97 are connected to a common positive output bus 35.

The SCR devices in the rectifier are gated by corresponding SCR drive circuits 100, 101 and 102 (FIG. 2A) which feed the gate electrodes 103, 104 and 105 of SCRs 93, 95 and 97, respectively. The SCR devices serve to regulate the output voltage from the rectifier 26, and thus are controlled to fire at a predetermined point on each input cycle, which point may be adjusted to vary the output voltage. The control for the SCR devices is derived from the input voltage lines 64, 65 and 66 by way of a delta-wye transformer 108 (FIG. 2A). The outputs from transformer 108 will be 30° out of phase with the voltage on lines 64, 65 and 66, and these out-of-phase voltages are applied to three corresponding clipper circuits, indicated diagrammatically at 110. Typically, the clipper circuits constitute a series resistance and a shunt Zener diode which convert the alternating voltages received from transformers 108 to square wave form for application to corresponding differentiator circuits 112. The three outputs from the differentiator, each of which represents one of the three phases A, B and C, are combined in an OR circuit 114, whereby each input produces an output on line 116 which may be amplified and applied to a single shot multivibrator circuit 118 which serves to normalize the pulses generated in the preceding circuitry. The single shot 118 thus produces an output pulse for each input received, the duration of the output pulse being approximately 110 μsec., which pulses are applied by way of line 120 to a latching circuit 122, resetting the latch to permit a capacitor in trigger circuit 124 to begin charging.

When the voltage across the capacitor reaches a predetermined value, a unijunction transistor is triggered into conduction to produce a gate signal on line 126, the gate pulse being fed back to set the latch 122. This prevents the trigger circuit from firing again until the latch is reset by the next output pulse from the single shot 118. The gate pulse also is fed to the three SCR drive circuits 100, 101 and 102 in parallel, whereby the SCR devices 93, 95 and 97 are gated on for the duration of the gate pulse and the appropriate SCR device will pass its corresponding power cycle.

A control resistor 128 is connected between the negative and positive lines 34, 35 of the rectifier, with a wiper arm 130 being provided to permit selection of a voltage for application to the charging capacitor of trigger circuit 124. This voltage controls the rate at which the capacitor charges and determines the firing point of the trigger circuit; thus, the output voltage of the rectifier may be regulated by adjusting the position of wiper 130. An auxiliary bias source (not shown) may be provided to insure that the trigger circuit fires no later than 90° after the start of the charging point for the trigger circuit capacitor; since the transformers 108 provide a 30° delay, the effective firing range of the SCR devices 93, 95 and 97 is from 30° to 120° of the corresponding input wave form.

Turning again to the illustration of FIG. 2B, it will be seen that the positive output line from rectifier 26 is fed through a first filter choke 132 to the positive side of the standby battery 38. This battery is connected across the rectifier output lines through suitable fuses and through a DC contactor 134 which permits removal of the battery from the system for servicing and the like. A bypass capacitor 136 shunted across the battery and contactor 134 cooperates with the filter choke 132 to dampen smooth the DC and switching transients. An ammeter 138 may be connected across a series resistor 140 in negative line 34 to provide a reading of the rectifier output current. Battery 38 is normally connected across lines 34 and 35 so as to be continuously charged by the rectifier output, and is of sufficient capacity to enable the batteries to replace the rectifier output voltage for a predetermined period of time upon failure of the utility source.

The positive side of the battery is connected through a second filter choke 142 to the positive input line of inverter 40; similarly, the negative side of battery 38 is connected by way of line 34 through a Hall effect device 144 and a current measuring resistor 146 to the negative input of inverter 40. An ammeter 148 may be connected across resistor 146 to monitor the current input to the inverter while the Hall effect device 144 measures the current flow in line 34 and produces a proportional output which is utilized by the logic control system to operate the inverter, as will be described below.

Inverter 40 consists of six silicon controlled rectifiers connected in a three-phase, full wave bridge configuration, the SCR devices being controlled so that the DC voltage across lines 34 and 35 is converted to a three-phase alternating current voltage on output lines 43, 44 and 45. To this end, SCR devices 150 and 151 are connected in series across lines 34, 35 with their anode-cathode junction being connected to line 43; SCR devices 152, 153 are connected in series across the DC lines with their anode-cathode junction being connected to output line 44; and SCR devices 154, 155 are connected in series across lines 34, 35 with their anode-cathode junction connected to output line 45. The gate electrode of each SCR device is connected to and controlled by the driver circuits 158. The inverter is appropriately fused, and a voltage suppressor is connected between the anode and cathode of each SCR device for protection against high voltage spikes and transients that might occur in the DC line. Connected across the DC lines is a suitable voltmeter 160 which monitors the voltage across battery 38, with a low voltage sensor device 162 being sensitive to a voltage value below a predetermined level to sound an alarm.

Operation of the inverter 40 is by way of drivers 158 which are, in turn, driven in the appropriate sequence by a ring counter and decoder 164, as set forth in the aforementioned copending application. The ring counter is driven by the voltage controlled oscillator 166 through a single shot circuit 168 which normalizes the output voltage from the oscillator to provide the pulse characteristics required by the ring counter. As in the copending application, the voltage controlled oscillator 166 is regulated to hold the output voltage on lines 43, 44 and 45 in phase with and at the same frequency as the utility voltage appearing on lines 20, 21 and 22 so that in the event of failure of the no break system, or if the no break system requires maintenance, the utility may be directly connected to the load by way of bypass 16 without affecting the critical load.

Synchronization between the utility input and the inverter output is maintained by the logic circuitry 48 generally indicated in FIG. 1, and more particularly by way of a logic supply transformer 170 (FIG. 2A) the primary of which is connected to lines 20, 21 and 22 and the secondary of which provides a reduced voltage on lines 172, 173 and 174. These lines are connected through a selector switch 176 and lines 178, 179 and 180 to the input of a zero cross-over network 182, which senses the sequence of the negative going voltage in each of the three phases A, B and C at the zero voltage cross-over point of their respective wave forms.

A zero cross-over is defined as the instant in time that a sine wave of alternating voltage crosses the zero volt line; a negative cross-over occurs when the voltage excursion is going negative. Network 182 consists of three individual squaring circuits, which may be Zener diode clipping circuits; the three square waves corresponding to the three phases are amplified and inverted and fed to three single shot circuits, each of which generates a 150 μsec. pulse for each negative going zero cross-over for each phase. These pulses are fed by way of lines 184, 185 and 186 to a phase comparator 188, where they are compared to a signal representing the phase A negative ring counter output. This signal is derived from the ring counter circuit 164 (FIG. 2B) and is applied by way of line 190 to the phase and frequency comparator 188. Each of the three inputs on lines 184, 185 and 186 are compared to the phase A signal on line 190, and when the two phase A signals reach zero at the same time, in their negative going excursions, the utility voltage and the inverter voltage are in phase. The comparator, which comprises a simple latching network, will then produce a digital output signal on line 192 indicating that the two signals are in phase. If the frequencies of the two input signals to comparator 188 are equal, the latching circuits will remain reset sufficiently long to permit the "phase OK" signal on line 192 to energize a time delay circuit 194 which will then produce an output on line 196 to energize a phase relay 198. As will be explained, the phase relay enables the system to start up, and permits the bypass contactors to be closed to shift the critical load from the motor-generator system to a direct connection with the utility source.

If the frequency of the inverter differs from that of the utility source, the input signal on line 190 representing the inverter phase A will not coincide with the phase A signal on line 186 for a sufficient period of time to allow the time delay 194 to operate. Instead, the ring counter phase A will coincide sequentially with the input phases A, B, C in that order if its frequency is less than the utility input; it will coincide in the order C, B, A if the inverter frequency is greater. If the signal on line 190 coincides with signals on lines 184 or 185, the latches in the phase and frequency comparator 188 will be set, thereby changing the signal on line 192 and indicating that the system is out of phase. When this out-of-phase situation occurs, there will be a continuing drift, and eventually the signal on line 190 will again coincide with the phase A signal on line 186. This will produce a phase OK signal on line 192, again of insufficient duration to operate the time delay 194.

Figure 3:
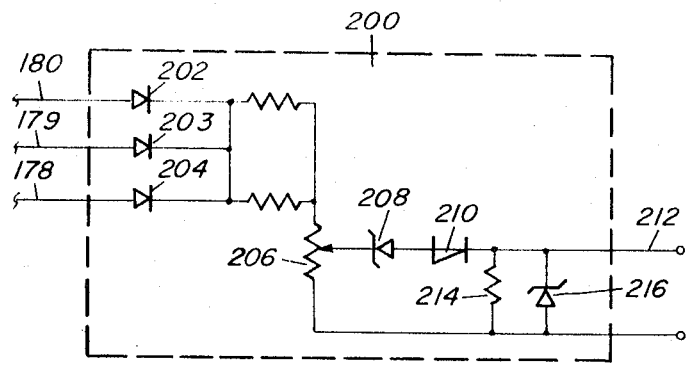
FIG. 3 is a schematic circuit diagram illustrating a high voltage sensor which may be used in the system of FIG. 2.

Also connected to the secondary of the logic supply transformer 170 (FIG. 2A) is a high and low voltage sensing circuit 200 which responds to the voltage level of the utility source to determine whether the utility is within the required limits. A typical voltage sensing circuit such as that utilized in network 200 is illustrated in FIG. 3. The three-phase alternating current is applied by way of lines 178, 179 and 180 through a half wave, three-phase rectifier comprising diodes 202, 203 and 204 which feed a potentiometer 206. The wiper arm of potentiometer 206 supplies a variable voltage through a Zener diode 208 and an 8 volt, four layer breakdown diode 210. When the voltage on the wiper of the potentiometer is below a selected value, e.g., 22 volts peak, the output voltage on line 212 is zero volts. When the voltage at the wiper exceeds 22 volts, the breakdown diode 210 will conduct, generating a voltage across shunt resistor 214, which voltage is limited by the parallel Zener diode 216. A positive voltage now appears on line 212, indicating the existence at the input lines 178, 179 and 180 of a high voltage. A similar circuit is used to sense low voltage, in which case an output appears when the line voltage is correct, but which drops to zero volts when a low voltage occurs; these outputs can be inverted by suitable logic circuitry so that a positive output signal represents a fault condition.

The existence of a signal representing either a high or a low utility voltage produces an output on line 218, which output is applied to a time delay network 220. If the fault condition sensed by network 200 exists for a predetermined length of time, a fault signal will be produced on line 222 which will energize a utility fail relay 224. The fault signal on line 222 also is applied to the phase and frequency comparator circuit 188, clamping the output of this circuit so that a phase OK signal cannot appear on line 192. As will be explained below, the utility fail relay operates a warning light and disconnects the bypass line 16 from the load if that line has been connected. The time delay output of circuit 220 is approximately 1.25 cycles to assure that when a fault signal occurs on line 222 it will remain at a steady level, instead of appearing as a string of pulses; thus, an input signal on line 218 occurring once per cycle will keep the output of the time delay 220 at a constant fault level. It will be noted that by removing the phase OK signal from line 192, an output from time delay circuit 220 serves to prevent the load from being shifted from the standby supply to the utility supply by way of the bypass line, for the bypass cannot be connected unless the phase relay 198 is energized, except in an emergency transfer.

Figure 4:
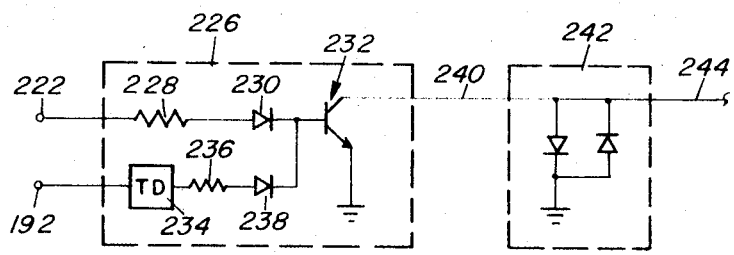
FIG. 4 is a schematic diagram of a preferred form of the loss of synchronization and ground clamping circuits of FIG. 2.

The digital fault signal on line 222 and the phase OK signal on line 192 may both be fed to a loss of synchronization circuit 226 which is illustrated in more detail in FIG. 4, to which reference is now made. The fault signal on line 222 is fed through a resistor 228 and a diode 230 to the base of a transistor switch 232, while line 192 is connected to a time delay circuit 234. In the absence of a phase OK signal on line 192, time delay circuit 234 becomes conductive after a predetermined period of time, providing a loss of phase signal through resistor 236 and diode 238, also to the base of transistor 232. Upon occurrence, then, of a utility fail signal, or in the absence of a phase OK signal, transistor 232 becomes conductive, and effectively grounds conductor 240. This serves to ground the analog control circuitry (to be described) for the voltage controlled oscillator 166 (FIG. 2B) which regulates the inverter 40, thereby eliminating the feedback loop control signal normally applied to the voltage controlled oscillator as a result of a second comparison of the phase A signal from the ring counter with the utility supply phase. Such grounding permits the oscillator to become free running at a predetermined frequency during the period of no voltage on the utility input lines. When voltage is restored to the utility, the zero cross over circuit and the high and low voltage sensing circuits disconnect the ground clamp, and restore oscillator control. However, the incoming power must be within one-half cycle of the frequency of the ring counter and decoder before control can be restored. The ground clamp circuit 242 illustrated in FIGS. 2B and 4 is shown as being a pair of oppositely connected diodes shunting line 240 to ground, but may also be considered to include transistor 232.

The output line 244 from ground clamp 242 is connected to the junction of an integrating amplifier 246 and a summing amplifier 248, which amplifiers serve to produce the input voltage which regulates the frequency of voltage controlled oscillator 166. Whereas the control circuitry heretofore described, including the zero cross-over networks 182, the high and low voltage sensing networks 200, and the phase and frequency comparator 188, operate in what may be generally termed a digital mode to produce either an on or an off signal (e.g., the phase OK signal is either present or absent and the utility fail signal is either present or absent), the present system also includes an analog control which functions to adjust the frequency of the inverter network 40 to bring it into phase with the utility source and maintain that phase synchronization. This analog control is fed through an integrating amplifier 246 and a summing amplifier 248, which amplifiers in turn produce the voltage required to regulate the voltage controlled oscillator 166. The junction of these amplifiers is connected to the ground clamp 242 described above.

The analog signals for controlling oscillator 166 generally comprise an adjustable set point, the output of a frequency sensitive discriminator, and a feedback loop from the load; these three signals are all applied to a common input line 250 for amplification in the summing amplifier 248. The DC bias set point is simply a potentiometer which permits adjustment of the input signal to a predetermined level, as indicated diagrammatically at 252 in FIG. 2B.

Figure 5:
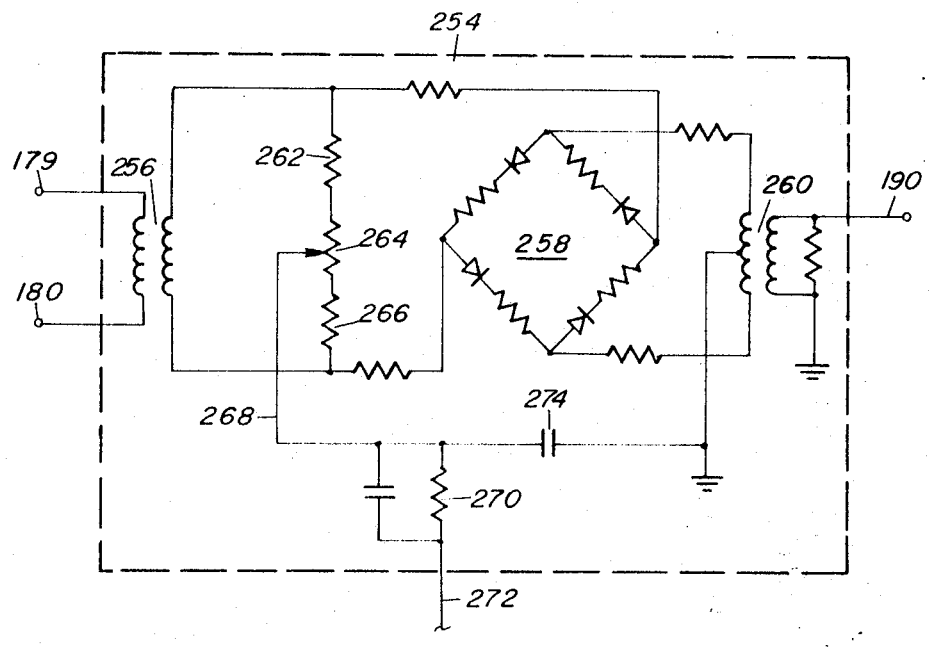
FIG. 5 is a schematic diagram of a discriminator circuit which may be used in the system of FIG. 2.

To provide an analog signal proportional to the phase angle difference between the utility power and the oscillator output, a discriminator circuit 254 is provided, shown in FIG. 2A and detailed in FIG. 5. As illustrated, the discriminator circuit includes three input lines, phases B and C from lines 179 and 180 of the utility source and the phase A signal from the ring counter which is carried on line 190. The phase B and phase C signals are applied to the discriminator through an input transformer 256, the secondary of which is connected to opposite terminals of a diode bridge 258. The remaining corners of the bridge are connected to the secondary of an input transformer 260, the primary of which receives the phase A signal on line 190. A voltage divider consisting of resistor 262, potentiometer 264 and resistor 266 is connected in series across the secondary of input transformer 256, with the wiper arm of the potentiometer being connected through line 268 and resistor 270 to the discriminator output 272. Line 268 is also connected through a capacitor 274 to a ground point, to which a center tap on the secondary of input transformer 260 is also connected. When the phase angle difference between the signal generated by the ring counter and the phase B and phase C signals from the utility has a preselected value, the output signal on line 272 will be nulled, and the frequency of the voltage controlled oscillator will not be changed; a change from the predetermined phase relationship will cause the output signal on line 272 to vary in a positive or negative direction to either increase or decrease the frequency of oscillator 166 slightly so that the oscillator will tend to bring the ring counter back into proper phase relationship with the utility source.

A third signal applied to the summing amplifier 248 is an automatic load advance signal which is derived from a current transformer at the load and is fed by way of line 276 (FIG. 2B) to modify the oscillator control in accordance with the load current characteristics.

The sum of the control voltages on lines 272, 276 and from the DC bias set point is applied through summing amplifier 248 and integrating amplifier 246 to the input of voltage controlled oscillator 166. A second input is applied to oscillator 166 by way of line 278 from the Hall effect device 144 which provides a signal on line 278 proportional to the current supplied by standby battery 38 or by the rectifier 26. This signal is amplified and fed directly into the voltage controlled oscillator at a common point with the output from integrating amplifier 246. The signal from the Hall device provides a rate feedback to stabilize the synchronous motor generator set, particularly under conditions of loading or unloading, and thus provides some "softness" in the system. Thus, if the current from the battery starts to increase, the Hall device will provide a signal which retards the phase angle of the oscillator slightly as compensation, thereby giving the oscillator 166 the equivalent of the generator "droop" that would be present if a generator were supplying the driving energy to the inverter.

Figure 6:
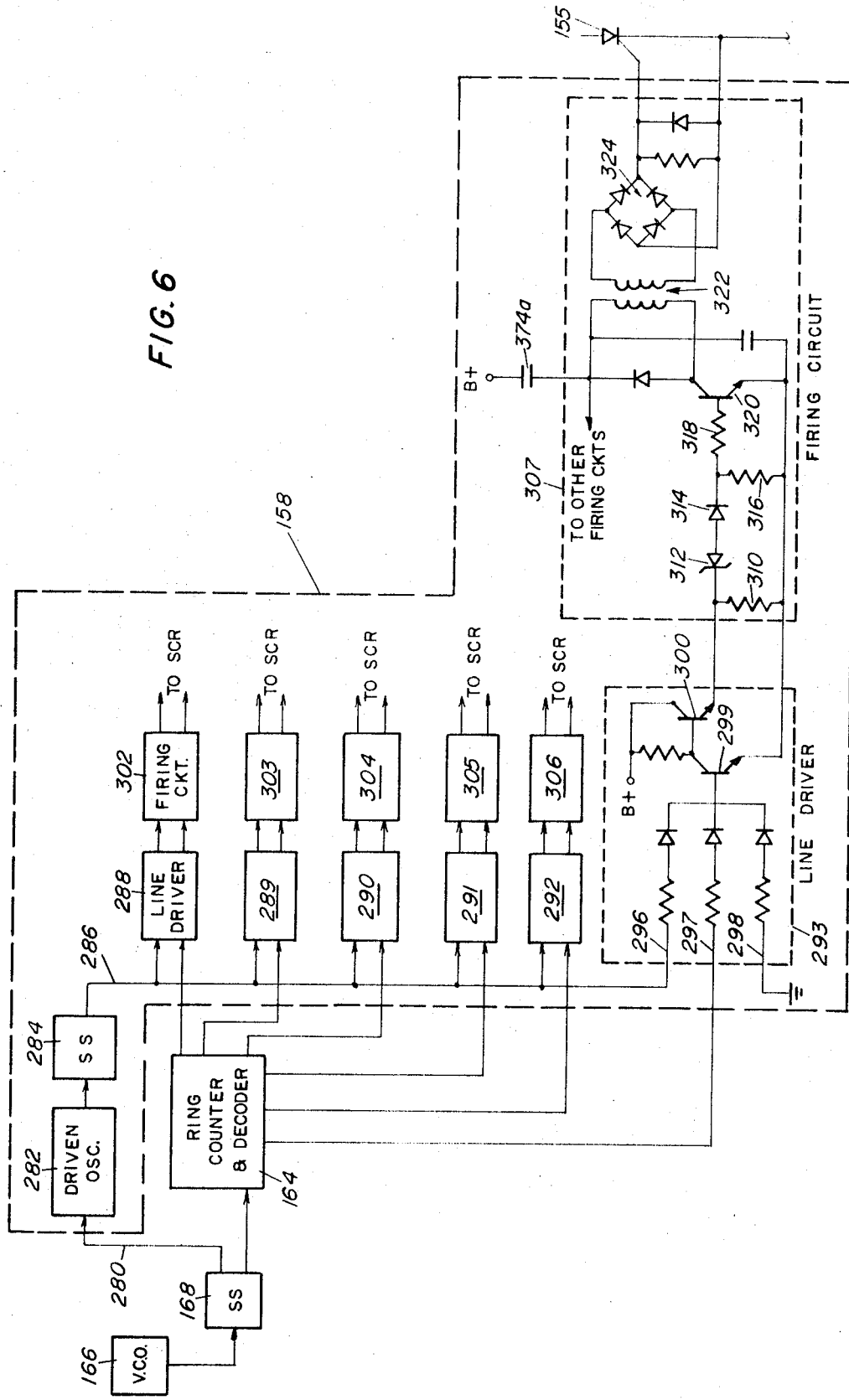
FIG. 6 is a schematic diagram of a typical inverter drive circuit.

The voltage controlled oscillator 166 produces an output signal the frequency of which is proportional to the amplitude of the voltages fed to it by the integrating amplifier 246 and the Hall effect device 144. This output signal is fed to a single shot circuit 168 which converts the output signal to a series of pulses of predetermined amplitude and duration to drive the ring counter and decoder 164, as has been explained, the output of the counter providing the sequential signals for energizing the inverter SCR devices by way of drivers 158. FIG. 6, to which reference is now made, is illustrative of the inverter driver circuit 158 and indicates a preferred arrangement for this circuit. The voltage controlled oscillator 166 and the single shot 168 produce clock pulses which not only drive the ring counter and decoder 164 but which are applied by way of line 280 to a burst generator which is comprised of an oscillator 282 and a single shot 284. The oscillator 282 is driven by the clock pulses, and thus is periodically energized to produce groups of 16 pulses having a repetition rate of approximately 150 microseconds. These pulse bursts are fed to the single shot 284 which normalizes them to a fixed amplitude and pulse width; conductor 286 feeds the normalized pulses to one of the inputs of each of a series of six line drivers 288 through 293. A typical line driver is shown at 293 as having three inputs, 296, 297 and 298, each of which is fed through a resistor and diode to the base electrode of a first transistor 299. The collector of transistor 299 is connected through a resistor to a bias source and is also connected directly to the base of a second transistor 300. The collector of transistor 300 is connected directly to the bias supply, while the output from the line driver is obtained between the emitters of the two transistors. As illustrated, the second input to each of the line drivers is one of the six outputs from the ring counter and decoder 164, while the third connection is to a ground reference point.

The outputs of the line drivers are fed to corresponding ones of the SCR firing circuits 302 through 307. As indicated in the typical circuit 307, the input is applied across a resistor 310 through a series Zener diode 312 and a conventional diode 314, across the shunt resistor 316 and through a series resistor 318 to the base of a transistor 320. The output signals from the line drivers are in the form of bursts of positive going pulses from the oscillator 282, each pulse causing transistor 320 to conduct, causing current to flow through the primary of a transformer 322 connected in the collector circuit of transistor 320. The pulses induced in the secondary of transformer 322 are rectified in the full wave rectifier 324 and the resultant DC output is applied across the cathode and gate electrodes of the corresponding SCR device, indicated here for example as SCR 155.

By driving the SCR devices 150 through 155 in the proper sequence and at the proper frequency, a three phase alternating current voltage will be provided on lines 43, 44 and 45 which will agree in phase and frequency with the utility source voltage. An ammeter 326 and a voltmeter 328 may be provided to monitor the power on lines 43, 44 and 45, with a selector switch 330 permitting connection of the meters to a selected phase. A motor circuit breaker 332 is provided in lines 43, 44 and 45 between the inverter 40 and the synchronous motor 42 (FIG. 2C) to open these lines in the event of an overload.

The synchronous motor 42 is driven by the inverter output at its synchronous speed, and drives, by way of mechanical coupling 50, the synchronous generator 52, the output of which is a three-phase alternating current voltage of the frequency, amplitude and wave form characteristics required by load 10, and which will be brought into and held in phase synchronization with the utility source by the control circuitry described hereinabove. A load circuit breaker 332 is provided at the output of the synchronous generator 52, and one phase of the generator is tapped to provide power for the power supply circuitry 334 which provides DC voltages for the logic circuits.

The generator stator windings are tapped to provide an input to a conventional generator voltage regulator 336 which is provided with a load voltage adjustment potentiometer 338 to permit the output voltage to be set to the desired level. The regulator controls the energization of generator field winding 340, whereby the voltage level on lines 53, 54 and 55 may be held at the desired level.

A current transformer 342 on one of the output lines from the synchronous generator provides an excitation current for a motor field control circuit 344 which permits adjustment of the excitation for the motor field winding 346.

The bypass lines 20, 21 and 22 are connected to the synchronous generator output between load circuit breaker 332 and load 10. Between this connection and the load is the automatic load advance circuit 348, which senses the load current by way of a current transformer. This circuit includes a rectifier 350 whereby the output of the current transformer is converted to a corresponding DC voltage, which may then be fed to a potentiometer 352. The wiper arm of the potentiometer thus carries a DC voltage having an amplitude that is proportional to the load current, which voltage is applied to the summing amplifier 248 by way of line 276, as explained hereinabove. The load current, voltage and frequency are monitored by ammeter 354, voltmeter 356 and frequency meter 358, selectively connected to the various phases of the load circuit by means of a phase selector switch 360. Finally, the load voltage is sensed by means of a transformer 362 connected across lines 53 and 54, whereby power is provided on line 364 for use in the control relay circuit to be described.

The operation of the present system will now be described in conjunction with the foregoing circuit description and the relay circuit of FIG. 7 to which reference will be made where necessary.

Upon connection of the utility source to the system by closure of the fused disconnect switch 60 and upon closure of the utility circuit breaker 78 and the battery disconnect switch 134, the rectifier 26 will begin to charge battery 38, providing a DC voltage across lines 34 and 35. The current flow to the battery may be read on ammeter 138 and the voltage read on voltmeter 160, while the voltage level may be adjusted by means of potentiometer wiper arm 130.

To start the synchronous motor-generator set, the motor circuit breaker 331 and the load circuit breaker 332 must be closed. The start button 366 (FIG. 7) may then be depressed, closing its contacts 336a and opening its contacts 336b. Closure of contacts 336a will energize the motor start relay 58R to close the bypass contactor 58 (FIG. 2C). Energization of relay 58R is accomplished by way of the utility power derived from the input transformer 62 by way of line 64 (FIG. 2A) and line 368. This phase A power is applied through normally closed overload relays 370 and 371, through the motor start relay 58R, through a normally closed off button 372, through contacts 336a and through a normally closed contact of a gate relay to be described to ground. A holding contact 58a bypasses the start button 366a and is closed upon energization of motor start relay 58R to hold that relay.

Upon closure of the bypass contact 58 in FIG. 2C, the utility source is applied to the synchronous generator 52, causing it to operate as a motor and to start rotating. At the same time, power is applied to the power supply 334 for the control logic circuits, energizing these circuits. The zero cross-over and high and low voltage sensing networks 182 and 200 begin to operate, feeding the phase and frequency comparator 188. The voltage controlled oscillator begins to operate, causing the ring counter to energize the SCR drive circuits, the ring counter producing a phase A signal for comparison with the utility in the phase and frequency comparator 188. The analog phase discriminator 254 also begins to operate, providing an input to the summing amplifier whereby the voltage controlled oscillator tends to bring the ring counter into phase with the utility source. When this occurs, the phase OK signal appears on line 192, and if this signal remains for a predetermined period of time, the time delay 194 will be energized to operate phase relay 198 (FIG. 2A).

Energization of relay 198 closes its normally open contact 198a (FIG. 7) to energize gate relays 374 and 376 (FIG. 7), which relays are now connected across DC lines 378 and 379 by way of normally closed contacts to be described. These DC lines are energized by a power supply 380 which derives its energization from the AC line 364 connected to the load lines as described with respect to FIG. 2C. Gate relay 374, upon energization, closes its normally open contact 374b to provide a holding circuit for the two gate relays through a normally closed contact to be described. Energization of relay 374 also closes its normally open contact 374a shown in the B+ supply of the SCR firing circuit 307 (FIG. 6). Until this time, the SCR inverter 40 has been de-energized, although the ring counter and remaining logic circuitry have been operative to bring the system into phase synchronization. At this point, after synchronization has been attained, the gate relay 374 applies the bias voltage to the SCR firing circuits 302 through 307, thereby energizing the inverter. At the same time, gate relay contact 376a is opened, and this contact de-energizes the motor start relay 58R, thereby opening bypass contactors 58.

The synchronous motor is then driven by the inverter output, and the synchronous generator 52 takes over the load supply. The system is now operative and carrying the critical load.

In this operative condition, the phase and frequency comparator and the frequency discriminator regulate the frequency of the voltage controlled oscillator to maintain synchronism between the load voltage and the utility supply. If the voltage or frequency of the utility vary from the nominal values, the phase relay 198 will be de-energized, and the utility fail relay 224 (FIG. 2A) will be energized. De-energization of relay 198 will open contact 198a in FIG. 7, but the gate relays 374 and 376 will remain energized through the holding contact 374a. The fault in the utility will operate ground clamp 242 (FIG. 2B) so that the voltage controlled oscillator will become free running and the inverter will then operate independently of the phase and frequency of the utility supply. The utility fail relay 224 energizes appropriate indicator lamps indicated generally at 382 in FIG. 7, and sounds an alarm, the alarm being generally indicated at 384. If an auxiliary generator is provided for the system, it will be started at this point by suitable relay circuits indicated generally at 386, and when the auxiliary generator reaches its rated output, it may be switched into the system by means of a transfer switch 24 as indicated in FIG. 1, or by other suitable means.

Figure 7:
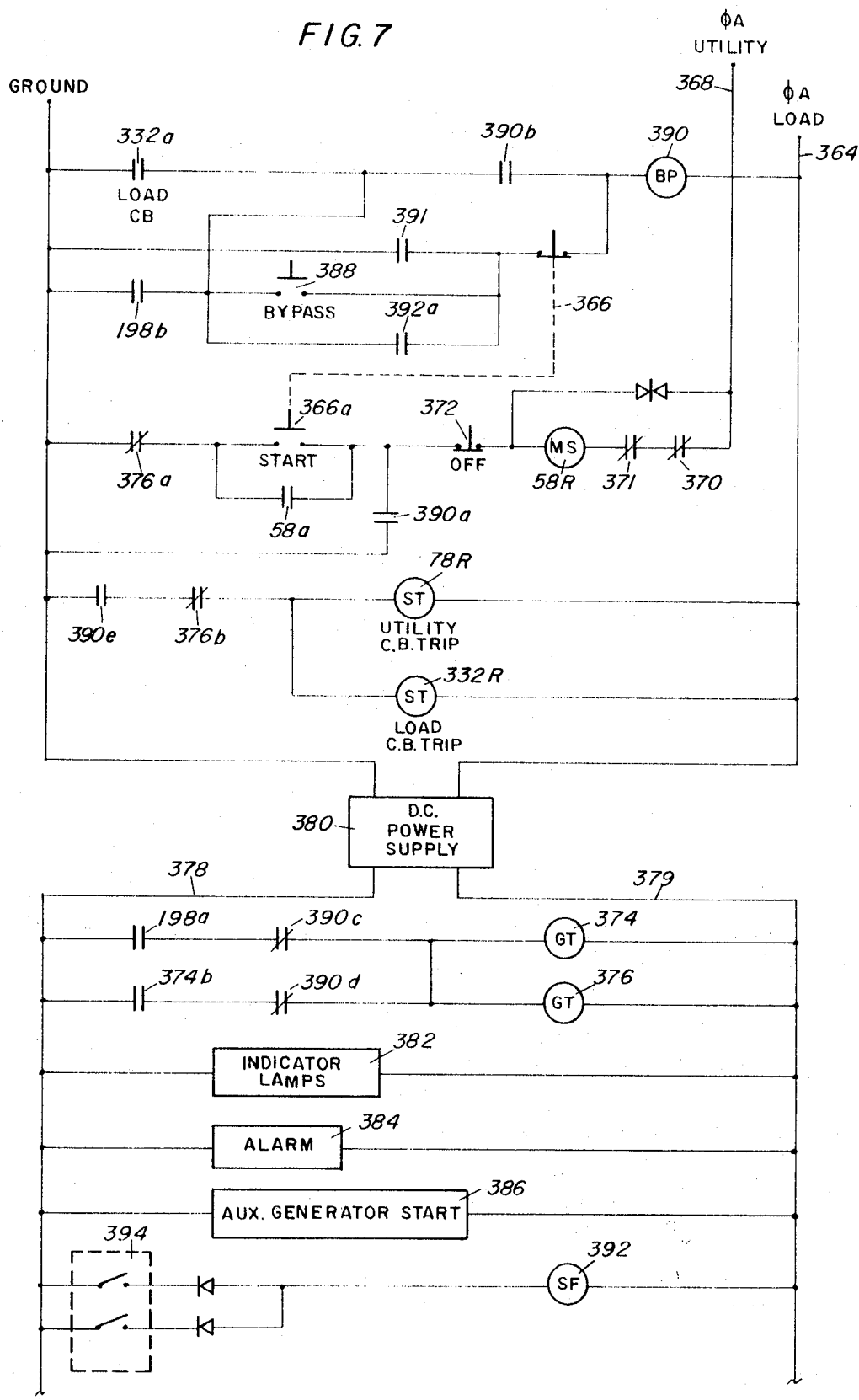
FIG. 7 is a diagram of a part of the relay control circuit used with the system of the present invention.

In the event that it is desired to bypass the no-break standby system, for example to perform normal maintenance work on the standby system, this may be accomplished by depressing the bypass button 388 (FIG. 7). If at this time the inverter is in phase with the utility input voltage, so that the phase relay 198 is energized, normally open phase relay contact 198b will be closed, thereby providing a circuit through pushbutton 388, normally closed contact 366b on the start button and through bypass relay 390, thereby energizing the relay. Energization of the bypass relay closes the normally open contact 390a to provide an energizing circuit for motor start relay 58R, thereby closing the bypass contacts 58 (FIG. 2C) and connecting the utility source in parallel with the inverter output. Bypass relay 390 is held in by closure of its normally open holding contact 390b through the load circuit breaker contact 332a which is at this time still closed.

The bypass relay 390 includes two delay contacts 390c and 390d, each connected in series with gate relays 374 and 376, and each being normally closed. A predetermined period after energization of relay 390, contacts 390c and 390d open, thereby de-energizing the gate relays 374 and 376. This removes the bias voltage from the firing circuits of the inverter, disabling inverter 40. The de-energization of gate relay 376 permits its normally closed contacts 376b to reclose. With bypass relay 390 energized, bypass contacts 390e will now be closed, thereby permitting energization of a utility circuit breaker trip relay 78R and a load circuit breaker trip relay 332R (FIG. 7) thereby opening the corresponding circuit breakers 78 and 332. The opening of circuit breaker 332 also results in the opening of circuit breaker contact 332a in series with the bypass relay 390, thereby permitting the bypass relay 390 to be de-energized when the phase relay opens its contacts 198b. The de-energization of the gate relay 376 allows normally closed contacts 376a to close, thereby providing a holding circuit through now closed contacts 58a for the motor start relay 58R. The load is now operating directly on the utility supply by way of the bypass, and the standby system is inoperative and disconnected from both the utility power and the critical load. Since this transfer occurs during the existence of a phase OK signal, the shift from the motor generator supply to the utility supply is accomplished without significant disturbance to the load.

It occasionally happens that it becomes necessary to shift the load from the standby system to the utility supply without waiting for phase synchronization. This is accomplished by means of an emergency stop button (not shown) which closes contact 391 to shunt phase relay contact 198b and bypass pushbutton 388, to shift the load to the bypass lines without regard to the phase relationship between the utility supply and the synchronous generator output. If this occurs when the phase relay is de-energized, a phase shift will occur at the load; thus, this should not be done except in case of emergency.

It will be apparent that the relay circuit of FIG. 7 is not a complete showing of the relay system, for many additional operations may be provided, if desired, to meet the specific requirements of an installation. For example, a standby system fault relay 392 may be provided which will respond to any one of a number of faults within the standby system itself. Such faults may result from an increase in the temperature of the rectifier, inverter, or other part of the system, from the opening of a rectifier, inverter, or battery fuse, or the like. Such an occurrence would close one or more of the sensing switches 394, thereby completing a circuit to the system fault relay 392. This would serve to close its normally open contact 392a which is connected in parallel to the bypass contact 388; closure of this contact serves to energize the bypass relay 390 automatically in the same manner as described above with respect to the operation of bypass switch 388. The system may also include various reset relays, together with indicator lights for the various fuses, for temperature, for battery condition and the like, as well as lamps corresponding to the various relays discussed above whereby an indication is given of which relays are energized.

In the system as described, the existence of a utility fault causes the system to shift to standby power, and requires the operator of the system to prepare the critical load for shut down within the time period for which the standby batteries are designed. Within this limited time, the system must be shut down if the utility source is not restored, or an auxiliary source must be provided. When the battery indicators show that the charge has reached a dangerously low level, a suitable indicator will light and the alarm horn will sound to indicate that the system should be bypassed immediately. When a system fault occurs, the standby will be automatically bypassed if it is in phase, but if not, it may become inoperative. In the event of an emergency, the bypass relay may be operated without regard to whether the system is in phase or not. After the system is on bypass, and it is desired to remove power from the critical load, this may be done merely by depressing the off button 372, thereby de-energizing relay 58R and opening the bypass contact.

From the foregoing, it will be seen that the synchronous motor-generator set driven by a DC source though an inverter may be used to provide standby power, as described in the above-identified copending application, and that such a motor-generator set may be used as a series source of supply to a critical load as well as in the parallel mode illustrated as the preferred embodiment of the said copending application. The use of this series mode simplifies the control system, and although the control logic is shown in greater detail herein, the basic operation is the same as that of the copending application. As will be apparent to those skilled in the art, numerous variations and modifications of the system and the disclosed circuitry may be made without departing from the principles of the invention as set forth herein. However, such modifications and changes are within the scope of this invention, as set forth in the following claims.

What is claimed is:

1. A no-break power supply system for providing power continuously to a critical load and for providing total electrical isolation of the load from the normal power source, comprising:
a synchronous motor-synchronous generator set mechanically coupled for concurrent rotation, said synchronous motor having a leading power factor;
a source of first alternating current;
rectifier means connected to said source of first alternating current for converting said first alternating current to direct current;
an inverter network having an input and an output and comprising a plurality of controlled rectifiers, each having a control electrode, the input of said inverter network being coupled to said rectifier means to receive said direct current;
pulse generating means for applying pulses to said control electrodes to selectively turn on said controlled rectifiers and provide a second alternating current at the output of said inverter network;
means connecting the output of said inverter network to said synchronous motor for supplying said second alternating current to said motor and for driving said motor continuously at a speed determined by the frequency of said second alternating current, the leading power factor of said synchronous motor serving to commutate said inverter network, said motor in turn driving said synchronous generator to produce a third alternating current;
a standby source of direct current connected to and normally floating across the input to said inverter network for supplying power to said system during a fault condition;
means responsive to said first and third alternating currents for controlling the frequency of said pulse generating means to bring said first and third alternating currents into phase synchronization;
means responsive to a fault condition for disabling said means for controlling the frequency of said pulse generating means, whereby said pulse generating means becomes free running;
and load means connected to said synchronous generator for continuously receiving only that current which is supplied by said synchronous generator whereby said load means is electrically isolated from said source of first alternating current.

2. The no-break power supply system of claim 1, wherein said pulse generating means includes a voltage controlled oscillator and wherein said means for controlling the frequency of said pulse generating means includes means for regulating the frequency of said oscillator.

3. The no-break power supply system of claim 2, wherein said means for regulating the frequency of said oscillator comprises sensing means for producing a first DC control signal proportional to the load current, means for producing a second DC control signal proportional to the phase angle difference between said pulse generating means and said first alternating current, and summing means for combining said first and second DC control signals, and wherein said means responsive to a fault condition includes a ground clamp for grounding the output of said summing means to disable said means for regulating the frequency of said oscillator, whereby said oscillator becomes free running.

4. The no-break power supply system of claim 3, wherein said source of first alternating current includes an auxiliary supply of alternating current, means for energizing said auxiliary supply upon the occurrence of a fault condition, and means for connecting said auxiliary supply to said system for supplying power thereto until said fault condition is corrected.

5. The no-break power supply system of claim 2, wherein said pulse generating means further includes a ring counter responsive to the output of said voltage controlled oscillator for producing a train of pulsed output signals for the control electrode of each of said inverter rectifiers, and firing means for each of said inverter rectifiers responsive to a corresponding train of pulsed output signals for sequentially turning on said rectifiers to provide said second alternating current.

6. The no-break power supply system of claim 5, wherein said means for regulating the frequency of said voltage-controlled oscillator comprises logic control means including phase comparison means for detecting phase differences between said first and second alternating currents.

7. The no-break power system of claim 6, wherein said phase comparison means comprises a frequency comparator for sensing and indicating whether said second alternating current is in phase or out of phase with said first alternating current, a phase discriminator for producing a phase control signal proportional to the difference in phase between said first and second alternating currents, and means for applying said phase control signal to said controlled oscillator for synchronizing said first and second alternating current.

8. The no-break power system of claim 7, further including clamp means for disabling said means for applying said phase control signal to said controlled oscillator when said frequency comparator senses that said first and second alternating currents are out of phase by a predetermined amount, whereupon said controlled oscillator becomes free running.

* * * * *